United States Patent Office 2,807,579
Patented Sept. 24, 1957

2,807,579

PRODUCTION OF HALOGENATED COMPOUNDS

Hyman M. Molotsky and Edward G. Ballweber, Chicago, Ill., assignors to Velsicol Chemical Corporation, Chicago, Ill., a corporation of Illinois No Drawing. Application March 13, 1956,
Serial No. 571,123

9 Claims. (Cl. 204—158)

This invention relates to a process for preparing a halogenated dicarboxylic acid chloride. More particularly, the present invention relates to a process for preparing tetrachlorosuccinoyl chloride by treatment of hexachlorobutadiene with gaseous molecular oxygen at an elevated temperature.

The process of the present invention is highly unusual since hexachlorobutadiene has heretofore been considered as an extremely inert compound. Exemplary of such inert properties is the discussion in Huntress Organic Chlorine Compounds, John Wiley and Sons, Inc., 1948, on pages 871–2, wherein it is indicated that the prior literature shows this compound will not react with chlorine in the presence of sunlight or with acids or alkalies, or engage in any other conventional chemical reactions relating to the unsaturated double bond or perchlorinated hydrocarbons. This early work summarized by Huntress has not been changed, and McBee in J. A. C. S., volume 77, page 4942 (1955), states: "It should be noted that extensive halogen substitution generally decreases the reactivity of the diene system; for example, hexachlorobutadiene behaves much like a saturated compound."

The present process is especially unusual in that a compound known to have such inert properties can be converted into a highly reactive acid chloride using mild reagents and moderate reaction conditions.

Generally, the process of the present invention comprises the passing of gaseous oxygen through hexachlorobutadiene at an elevated temperature. The mode of reacting gaseous molecular oxygen with the liquid chlorinated hydrocarbon is preferably to introduce the gas below the surface of the liquid in a steady stream. Since the reaction is dependent in part upon contact with the gaseous oxygen, it is recommended that the oxygen be introduced by the use of sintered glass or porous orifices which will maintain the oxygen in a highly divided state, thereby increasing the interfacial area of contact.

The temperature of this reaction may vary, but, generally, temperatures from about 50° C. to about 300° C. are operable, and temperatures from about 170° C. to about 210° C. are preferred. The reaction may be conveniently run in conventional apparatus and since pressure is not a critical factor, the apparatus may be open to the atmosphere. The process of the present invention can also be run as a continuous process by passing the gaseous oxygen countercurrently through a moving bed of the liquid hexachlorobutadiene. In such a process the acid number of the reaction mixture can be used to follow the course of the reaction. If the reaction is run under atmoshpheric pressure, then the maximum temperature is limited to about 210° C. due to the boiling point of hexachlorobutadiene. However, the use of superatmospheric pressures up to about 200 pounds per square inch is advantageous in producing higher yields through better contact of the liquid hexachlorocyclobutadiene and oxygen. It also allows the use of the aforesaid higher temperatures.

In addition, the use of ultraviolet light and chlorine gas are valuable catalysts in the process of the present invention, although not necessary to its success. By exposing the reaction mixture to actinic radiation, e. g., the light from a mercury vapor lamp, especially during the early stages of the reaction, side reactions can be minimized and the reaction rate and degree of completion can be appreciably increased. Similar advantages are obtained when chlorine gas is mixed into the stream of oxygen gas. The use of these or other catalysts is desirable, but is not a requirement for the oxidation of hexachlorobutadiene in accordance with the present invention.

The rate of oxygen influx will depend upon several factors, among which are the temperature of the reaction, the size of oxygen bubbles, and the length of contact time. Another factor which may affect the reaction is the purity of the oxygen reactant. For example, while the use of substantially pure gaseous oxygen is preferred, various diluents, such as nitrogen, may be used. Ordinary air can be used in the present process, but the use of air will prolong the reaction and rate of conversion, since it contains only about 20% oxygen and the remainder inert materials, such as nitrogen. Generally, the rate of oxygen influx should be about 100 cc. per minute per mole of hexachlorobutadiene, and a preferred rate of oxygen influx is between about 800 and 1200 cc. per minute per mole. It should be understood that these rates apply to the pure oxygen reactant, and where oxygen is used in a dilute form, as by the use of air, the rate of reaction will be accordingly reduced.

While a preferred procedure in the process of the present invention is to react the hexachlorobutadiene with gaseous oxygen in the absence of solvent, thus eliminating the necessity of later separations, the use of solvents is not detrimental to the present process. Such solvents should preferably be inert to gaseous oxygen and to the organic acid chlorides which are produced by this process.

The time of reaction will vary with other factors, such as, temperature at which the reaction is carried out, the area of contact, the contact time, and the rate of oxygen throughput. Generally it may be stated that satisfactory yields will be obtained in periods of time ranging from about 2 hours to about 250 hours, and a more preferred range of time is from about 70 hours to about 150 hours.

The process of the present invention is highly unusual and unexpected, both in view of the fact that hexachlorobutadiene is considered extremely inert and that the product produced is very unusual. While the mechanism for the process of the present invention is not fully understood, it is to be noted that it involves a series of complex transformations. For example, the hexachlorobutadiene reactant loses its unsaturation and the terminal carbon atoms are oxidized to produce carbonyl groups. Concomitantly with such reaction, there is apparently a migration of chlorine atoms formerly affixed to such terminal atoms to the two carbon atoms in the form of the chain.

That such a complex product should result from the use of a mild reagent and mild operating conditions is highly unexpected, especially in view of the fact that the prior art indicates that the use of such strong reagents, such as sulfuric acid, alkalies, and the like, has no effect upon this material.

The product of the process of the present invention is highly useful, both in its present state as an acid chloride and as an intermediate for the production of tetrachlorosuccinic acid. Tetrachlorosuccinic acid is useful as a reactant in the production of polyester resins wherein the high percentage of chlorine will impart fire resistance to the polyester product. The tetrachlorosuccinc acid can be prepared by the present process by performing the oxidation of hexachlorobutadiene in the presence of a hydrolyzation agent such as dilute alkali or sulfuric acid. This acid also can be prepared by preparing the acid chloride in accordance with the process of the present invention and hydrolyzing in the presence of a hydrolyzation agent such as dilute caustic or acid. The product produced by the process of the present invention has utility as an intermediate in the production of insecticides, fungicides, and other agricultural chemicals.

The following examples illustrate the process of the present invention:

*Example I*

Into a 500 cc. three-necked flask equipped with thermometer, sparger, and stirrer were placed 300 grams of hexachlorobutadiene heated to about 180–210° C. Oxygen gas was passed through the sparger which extended below the surface of the liquid, and bubbled through the heated reactant at a rate of 800–1200 cc. per minute with stirring. The heating and oxygen were continued for 72 hours, during which time the refractive index of the mixture dropped from about $n_D^{20}$ 1.5548, for the pure hexachlorobutadiene, to a value of 1.5246 at the end of the reaction period. The crude product was cooled and fractionally distilled under vacuum. A fraction boiling at 50.5° C. at 0.25–0.27 mm. of mercury pressure was recovered. This fraction was identified as tetrachlorosuccinoyl chloride.

This product was reacted with analine to produce the dianalide derivative which when recrystallized from hexane had a melting point of 118.5 to 119.5° C. and elemental analysis as follows:

|  | C | H | Cl | N |
|---|---|---|---|---|
|  | Percent | Percent | Percent | Percent |
| Calculated for $C_{16}H_{12}O_2Cl_4N_2$ | 47.31 | 2.98 | 34.92 | 6.89 |
| Found for product | 47.55 | 3.50 | 34.68 | 6.66 |

*Example II*

Into a glass, three-necked flask equipped with thermometer, sparger and stirrer were placed 500 g. of hexachlorobutadiene heated to about 130–160° C. Oxygen was bubbled through at a rate of 800–1200 cc. per minute. The heating and oxygen sparge was continued for 6 hours. Upon cooling the reaction mixture to room temperature, the product was recovered therefrom as the fraction boiling at about 50° C. at 0.25 mm. of mercury pressure and identified as tetrachlorosuccinoyl chloride. This acid chloride was added slowly to 0.1 N NaOH and the product recovered from said solution was tetrachlorosuccinic acid.

The aforementioned examples exemplify the process of the present invention, but the broad scope of the invention is not limited to the conditions shown therein. On the contrary, as was mentioned previously, catalysts such as ultraviolet light and chlorine gas and superatmospheric pressures may be employed to increase yields and to permit the use of lower temperatures in which range undesirable side reactions are less probable.

A noteworthy feature of the present invention is that the oxidation does not impair the difunctionality and carbon chain length of the starting material. This is unexpected in the oxidation of an organic compound with as many as four carbon atoms where there is a tendency for a splitting up or fragmentation of the oxidized substance. It is extremely valuable in that difunctional compounds are capable of undergoing reactions of which monofunctional compositions are incapable of entering into. Consequently, these difunctional compounds in many ways are valuable in applications in which their monofunctional counterparts are not useful. The methods which are known to the art for the preparation of these compounds do not appear to be commercially competitive with the process of the present invention, due to the relatively low raw material and equipment cost necessary to operate the present invention.

Thus, the present process is novel in that it involves the oxidation of a relatively stable material by a relatively weak oxidizing agent, that the product has the same carbon chain length as that of the starting material, that the product possesses difunctionality and that it utilizes relatively inexpensive and readily available raw materials.

We claim:

1. A process for preparing tetrachlorosuccinoyl chloride which comprises intimately contacting oxygen and hexachlorobutadiene while heating the latter to a temperature between about 50° C. and about 300° C.

2. A process for the oxidation of hexachlorobutadiene to produce tetrachlorosuccinoyl chloride which comprises heating hexachlorobutadiene to a temperature between about 50° C. and about 300° C. while passing oxygen therethrough.

3. A process for the oxidation of hexachlorobutadiene to produce tetrachlorosuccinoyl chloride which comprises heating hexachlorobutadiene at a temperature between about 50° C. and about 210° C. while passing oxygen therethrough in the presence of ultraviolet radiation.

4. A process for the oxidation of hexachlorobutadiene to produce tetrachlorosuccinoyl chloride which comprises heating a mixture of hexachlorobutadiene and oxygen at a temperature between about 50° C. and about 300° C. in the presence of chlorine.

5. A process for the oxidation of hexachlorobutadiene to produce tetrachlorosuccinoyl chloride which comprises heating hexachlorobutadiene at a temperature between about 50° C. and about 300° C. and maintaining the mixture at superatmospheric pressure up to about 200 pounds per square inch while passing oxygen therethrough.

6. A process which comprises passing oxygen through a body of hexachlorobutadiene while heating the latter at a temperature between about 50° C. and about 300° C., and separating tetrachlorosuccinoyl chloride as a product of the process.

7. A process which comprises passing oxygen through a body of hexachlorobutadiene while heating the latter at a temperature between about 50° C. and about 300° C. in the presence of a hydrolyzation agent, and separating tetrachlorosuccinic acid as the product of the process.

8. A process which comprises passing oxygen through a body of hexachlorobutadiene while heating the latter at a temperature between about 50° C. and about 300° C., adding a hydrolyzation agent to the reaction mixture, and separating tetrachlorosuccinic acid as the product of the process.

9. A process for the oxidation of hexachlorobutadiene to produce tetrachlorosuccinoyl chloride which comprises heating hexachlorobutadiene to a temperature between about 170° C. and about 210° C. while passing oxygen therethrough.

References Cited in the file of this patent

UNITED STATES PATENTS

| 2,426,224 | Kharasch | Aug. 26, 1947 |
| 2,736,695 | Calfee et al. | Feb. 28, 1956 |